(12) United States Patent
Yeo

(10) Patent No.: US 8,394,523 B2
(45) Date of Patent: Mar. 12, 2013

(54) SECONDARY BATTERY

(75) Inventor: Kwang-Soo Yeo, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 280 days.

(21) Appl. No.: 12/960,060

(22) Filed: Dec. 3, 2010

(65) Prior Publication Data

US 2011/0159328 A1    Jun. 30, 2011

(30) Foreign Application Priority Data

Dec. 31, 2009    (KR) .................. 10-2009-0135203

(51) Int. Cl.
*H01M 2/18* (2006.01)

(52) U.S. Cl. ............ 429/138; 429/66; 429/67; 429/100; 429/167; 429/175; 429/176; 429/186

(58) Field of Classification Search .............. 429/66–67, 429/96, 98–100, 138, 167, 176–176, 186
See application file for complete search history.

(56) References Cited

FOREIGN PATENT DOCUMENTS

| KR | 10-2003-0039703 A | 5/2003 |
| KR | 10-2005-0020357 A | 3/2005 |
| KR | 1020050020357 A | 3/2005 |
| KR | 10-2006-0059685 A | 6/2006 |

OTHER PUBLICATIONS

KIPO Office Action for corresponding Korean priority application No. 10-2009-0135203 date May 26, 2011, 1 page.

*Primary Examiner* — Patrick Ryan
*Assistant Examiner* — Ben Lewis
(74) *Attorney, Agent, or Firm* — Knobbe Martens Olson & Bear LLP

(57) ABSTRACT

A secondary battery includes an electrode assembly having a first electrode plate, a second electrode plate and a separator interposed therebetween. A pouch case includes an accommodating portion for accommodating the electrode assembly and a cover portion for sealing the accommodating portion. A reinforcing member is formed between the pouch case and the electrode assembly. In the secondary battery, the reinforcing member includes a first frame formed along one surface of the pouch case, which comes in contact with the electrode assembly, a support portion formed in form of a plate while being spaced apart from the first frame, and a second frame to connect the first frame and the support portion to each other.

23 Claims, 5 Drawing Sheets

SECONDARY BATTERY

CROSS-REFERENCE TO RELATED APPLICATIONS

This application claims priority to and the benefit of Korean Patent Application No. 10-2009-0135203, filed on Dec. 31, 2009, in the Korean Intellectual Property Office, the entire content of which is incorporated herein by reference.

BACKGROUND

1. Field

An aspect of the present invention relates to a secondary battery, and more particularly, to a secondary battery capable of being protected against external impact by reinforcing the strength of a pouch case constituting an outer casing of the secondary battery.

2. Description of the Related Technology

Secondary batteries are of great importance for they are used as power sources of many portable wireless devices such as a video camera, a mobile phone, a notebook computer and a portable personal digital assistant (PDA). Furthermore, since such secondary batteries can be used many times by recharging the batteries, they are more economical than disposable batteries.

A secondary battery is generally formed in the shape of a metallic can. A cylindrical or rectangular parallelepiped can has an opening formed at one side thereof, and an electrode assembly and an electrolyte are injected into the can through the opening. A bare cell is formed by sealing the can with a cap assembly having a size and shape corresponding to the opening.

Meanwhile, a nonaqueous electrolyte is used for a lithium secondary battery because of the reactive property of lithium and water. The electrolyte may be a solid polymer electrolyte containing lithium salt or a liquid electrolyte obtained by dissociating lithium salt in an organic solvent. Alternatively, the electrolyte may be an electrolyte obtained by infiltrating a liquid electrolyte into a separator. When the solid polymer electrolyte simultaneously serves as the separator and the electrolyte, the risk of liquid leaking is low, and therefore, a pouch may be used as a case for the electrode assembly and the electrolyte.

Pouch cases have light weight, small volume and adaptability in the shape of batteries or the installation method in devices as compared with cans made of metal. Therefore, it is advantageous to use the pouch cases for secondary batteries.

In a pouch type secondary battery, an electrical path through which an electrode in the interior of a pouch case is communicated with the exterior is secured using a tab connected to the electrode while sealing the pouch case having an electrode assembly accommodated therein. A core pack is formed by connecting a component or structure such as a protecting circuit module (PCM) or positive temperature coefficient (PTC) to a bare cell having the sealed pouch case using the tab. Then, a hard pack battery may be completed by inserting the core pack into a hard case and joining them together. Alternatively, an inner pack battery may be completed by adding a frame to the exterior of the core pack and surrounding them with a label for packaging.

Such a pouch case includes an accommodating portion having a groove in which an electrode assembly is accommodated, and a cover for covering the groove. Here, the groove is formed through press working, and the groove may not be formed based on the shape of the pouch case.

A general electrode assembly is formed into a multi-layered film in which a positive electrode, a separator and a negative electrode are sequentially stacked, or is formed into a jelly roll obtained by winding the multi-layered film. When the jelly roll is wound, a separator is additionally attached to the electrode surface exposed to the exterior of the jelly roll so as to prevent a short circuit between the positive and negative electrodes. When the jelly roll is put in a lower groove of the pouch case, the pouch case is sealed by tightly attaching front flanges to each other and then heating and pressurizing an edge portion protruded outward from the groove along the flanges.

Since the pouch case with such a structure is formed very thin, there is a limitation in protecting the electrode assembly accommodated in the pouch case using only the pouch case, and therefore, the pouch case is weak to external impact.

Further, the electrode assembly accommodated in the pouch may cause a swelling phenomenon where gas is generated in the interior of a battery as the battery is initially charged or discharged. That is, when gas is generated in the interior of electrode plates, the electrode plates are swelled in both side directions of the pouch case, and the volume of the pouch case is expanded. Therefore, a short circuit is formed at an edge portion of the positive and negative electrode plates.

SUMMARY OF CERTAIN INVENTIVE ASPECTS

In one embodiment, there is provided a secondary battery capable of being protected from external impact and enhancing its safety by inserting a reinforcing member into an inner surface of a pouch case constituting an outer casing of the secondary battery.

In another embodiment, there is provided a secondary battery capable of preventing the volume of an electrode assembly from being expanded due to the swelling phenomenon caused when the secondary battery is initially charged or discharged.

According to an aspect of the present invention, there is provided a secondary battery including an electrode assembly having a first electrode plate, a second electrode plate and a separator interposed therebetween; a pouch case having an accommodating portion to accommodate the electrode assembly and a cover portion to seal the accommodating portion; and a reinforcing member formed between the pouch case and the electrode assembly, wherein the reinforcing member includes a first frame formed along a circumference of one surface of the pouch case, which comes in contact with the electrode assembly, a support portion formed in the shape of a plate while being spaced apart from the first frame, and a second frame to connect the first frame and the support portion to each other.

According to another aspect of the present invention, the reinforcing member may be formed on at least one of a bottom inner surface of the accommodating portion and an inner surface of the cover portion.

According to another aspect of the present invention, the first frame, the second frame and the support portion may be formed into a single metal plate.

According to another aspect of the present invention, the support portion of the single metal plate may be formed flat or may be formed concavely toward the electrode assembly.

According to another aspect of the present invention, the first frame, the second frame and the support portion may be formed into a single plate spring.

According to another aspect of the present invention, the support portion of the single plate spring may be formed flat or may be formed concavely toward the electrode assembly.

According to another aspect of the present invention, the support portion may be formed into a metal plate or plate spring.

According to another aspect of the present invention, the support portion may be formed flat or may be formed concavely toward the electrode assembly.

According to another aspect of the present invention, the first and second frames may be formed into an elastic body.

According to another aspect of the present invention, the support portion may be formed to have the same size as 30 to 100% of the surface of the electrode assembly.

According to another aspect of the present invention, the reinforcing member may be forcibly inserted into the pouch case.

According to another aspect of the present invention, the reinforcing member may be fixed to the pouch case using tape or heat compression.

According to another aspect of the present invention, corners of the first frame may be formed rounded.

According to another aspect of the present invention, the support portion, the first frame and the second frame may be formed of a material having a greater strength than that of the pouch case.

According to another aspect of the present invention, the electrode assembly may be formed by winding the first electrode plate, the second electrode plate and the separator interposed therebetween.

According to another aspect of the present invention, the electrode assembly may be formed by stacking the first electrode plate, the second electrode plate and the separator interposed therebetween.

As described above, in a secondary battery according to an embodiment of the present invention, a reinforcing member is inserted into a pouch case constituting an outer casing of the secondary battery, so that the safety of the pouch case can be enhanced by protecting the secondary battery from external impact. Accordingly, it is possible to enhance the reliability and productivity of the secondary battery.

According to another aspect of the present invention, it is possible to prevent the volume of an electrode assembly from being expanded due to the swelling phenomenon when the secondary battery is initially charged or discharged, thereby reducing a change in outer dimension of the secondary battery and preventing a short circuit at an end portion of the electrode assembly.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE CERTAIN INVENTIVE EMBODIMENTS

Figure 1:
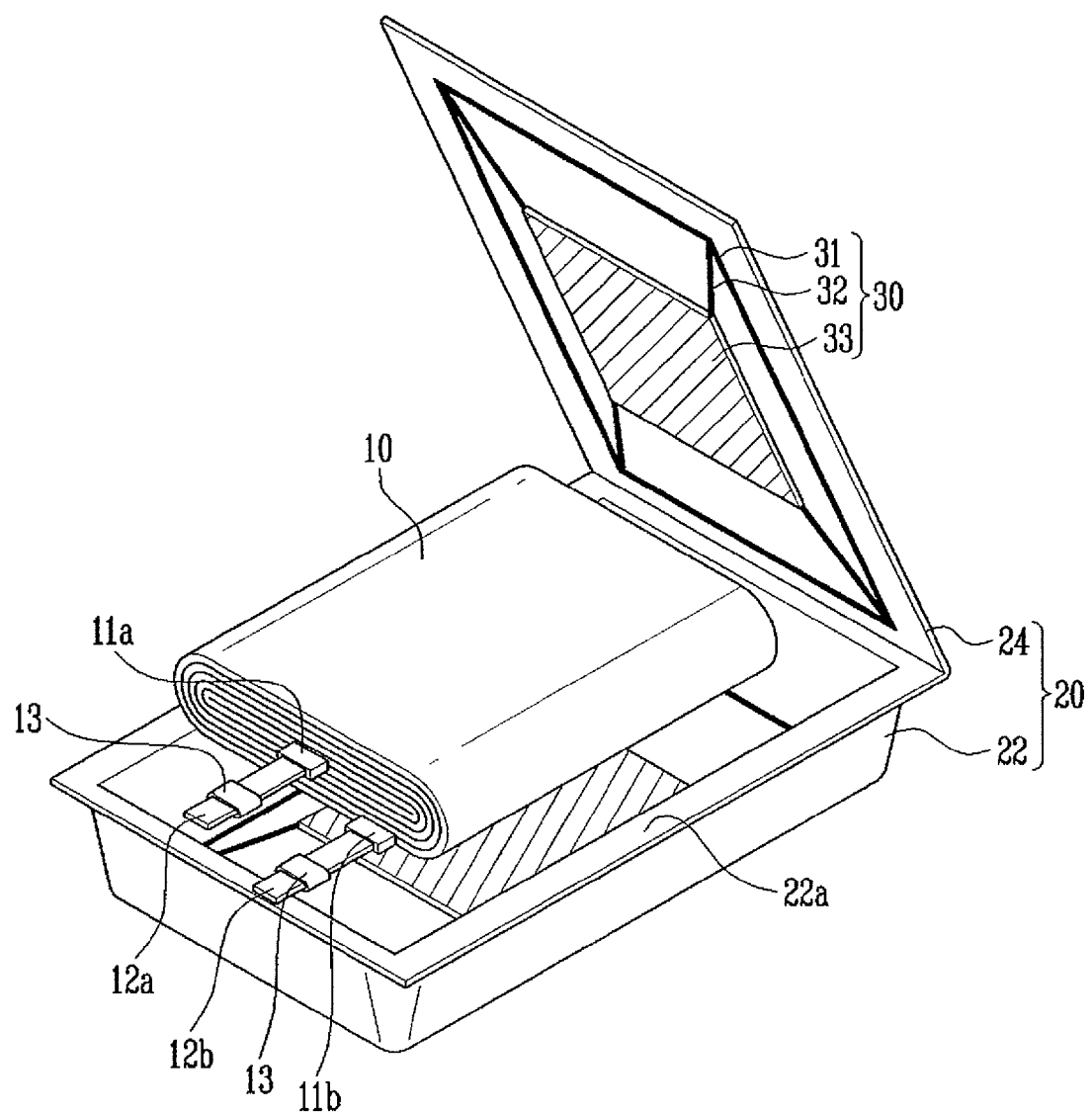
FIG. 1 is an exploded perspective view of a pouch type secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Figure 2:
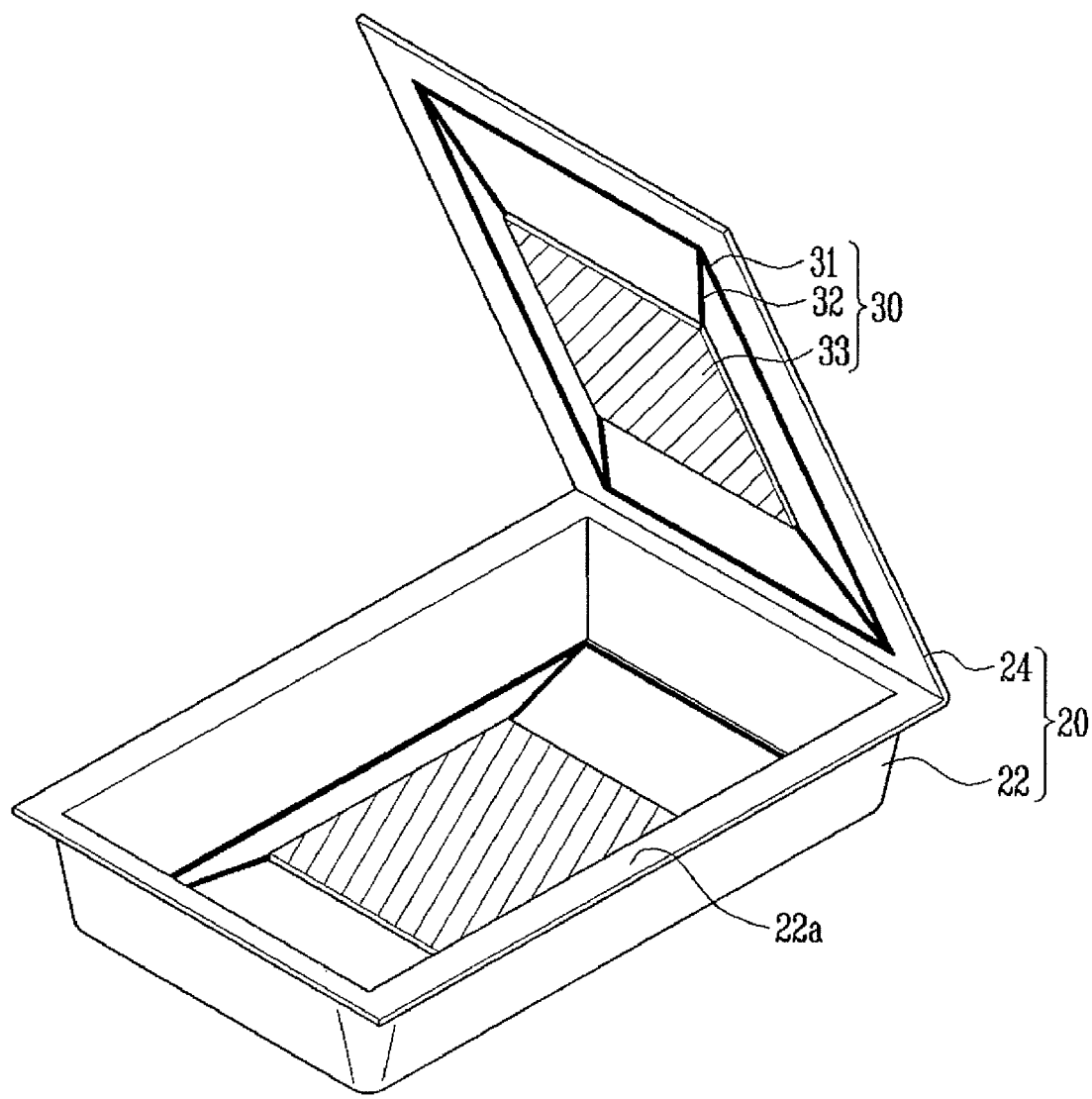
FIG. 2 is a perspective view illustrating a reinforcing member formed on a pouch case according to an embodiment of the present invention.

FIG. 1 is an exploded perspective view of a pouch type secondary battery according to an embodiment of the present invention. FIG. 2 is a perspective view illustrating a reinforcing member formed in a pouch case according to an embodiment of the present invention.

Referring to FIGS. 1 and 2, the pouch type secondary battery according to an embodiment of the present invention includes an electrode assembly 10 to generate current; and a pouch case 20 having an accommodating portion 22 to accommodate the electrode assembly 10 and a cover portion 24 to seal the accommodating portion 22. The pouch type secondary battery further includes a reinforcing member 30 formed between the pouch case 20 and the electrode assembly 10.

The reinforcing member 30 may be formed on at least one of a bottom inner surface of the accommodating portion 22 and an inner surface of the cover portion 24. That is, the reinforcing member 30 may be formed on only one of the bottom inner surface of the accommodating portion 22 and the inner surface of the cover portion 24. Alternatively, as illustrated in FIGS. 1 and 2, the reinforcing member 30 may be formed on both of the bottom inner surface of the accommodating portion 22 and the inner surface of the cover portion 24.

The reinforcing member 30 includes a first frame 31, a second frame 32 and a support portion 33. The first frame 31 is formed along the bottom inner surface of the accommodating portion 22, which comes in contact with the electrode assembly 10, and a periphery of the cover portion 24. At this time, corners of the first frame 31 may be formed in a prismatic shape.

The support portion 33 is positioned toward the electrode assembly 10 from the first frame 31 while being spaced apart from the first frame 31 by a predetermined distance. The support portion 33 is formed in the shape of a flat plate. The support portion 33 and the first frame 31 are connected to each other by the second frame 32. In these figures, the second frame 32 is connected from the corner of the first frame 31 to the corner of the support portion 33. However, it will be apparent that the second frame 32 may be formed in another shape so that the support portion 33 can be stably fixed to the first frame 31 while being spaced apart from the first frame.

Here, the first and second frames 31 and 32 may be formed of an elastic body so as to reduce the force of an impact applied to the electrode assembly 10 held by the support portion 33 which is formed into a plate spring.

The reinforcing member 30 is formed between the pouch case 20 and the electrode assembly 10, so that the strength of the pouch case 20 constituting an outer casing of the secondary battery can be reinforced, thereby protecting the secondary battery from external impact. Further, it is possible to prevent the volume of the electrode assembly 10 from being expanded due to the swelling phenomenon when the secondary battery is initially charged or discharged, thereby reducing a change in outer dimension of the secondary battery and preventing a short circuit at an end portion of the electrode assembly 10.

In this embodiment, the support portion 33 is formed in a quadrangle shape. However, the support portion 33 may be formed in various shapes capable of reinforcing the strength of the pouch case 20 or preventing the swelling phenomenon. Alternatively, the support portion 33 may be formed into a plate spring. Accordingly, although impact is applied to the secondary battery from the exterior, the plate spring absorbs impact energy, thereby reducing the impact applied to the electrode assembly 10.

The surface size of the support portion 33 may be at or over 30% of the surface size of the electrode assembly 10, which comes in contact with the pouch case 20. If the support portion 33 has a surface size below 30% of the surface size of the electrode assembly, which comes in contact with the pouch case 20, the external impact cannot be sufficiently absorbed. Since the support portion 33 is used to absorb the impact applied to the electrode assembly 10, there is no need for the support portion 33 to be larger than the electrode assembly 10.

When the reinforcing member 30 is formed on the bottom inner surface of the accommodating portion 22 or the inner surface of the cover portion 24, the electrode assembly 10 is accommodated in the accommodating portion 22, and a portion 22a at which the accommodating portion 22 comes in contact with the cover portion 24 is then sealed by folding the cover portion formed at one side of the accommodating portion 22. As a result, the secondary battery of this embodiment is manufactured. Here, the reinforcing member 30 may be fixed to the pouch case 20 using tape or heat compression. The first frame 31 of the reinforcing member 30 may be of a same size and shape as the inner surface of the accommodating portion 22 of the pouch case 20 so as to be forcibly inserted into the pouch case 20.

Since the first frame 31, the second frame 32 and the support portion 33 in the reinforcing member 30 function to reinforce the strength of the pouch case 20 formed of aluminum, they may be formed of a material having a larger strength than that of the pouch case 20.

The electrode assembly 10 accommodated in the interior of the pouch case 20 is formed by winding a first electrode plate, a second electrode plate and a separator interposed therebetween. A first electrode tab 12a is connected to the first electrode to protrude upward from the electrode assembly 10, and a second electrode tab 12b is connected to the second electrode plate to protrude upward from the electrode assembly 10. In the electrode assembly 10, the first and second electrode tabs 12a and 12b are electrically isolated from each other while being spaced apart from each other at a predetermined distance. Lamination tapes 11a and 11b are wound at portions of the first and second electrode tabs 12a and 12b extracted from the electrode assembly 10, respectively. The lamination tapes 11a and 11b function to block heat generated from the first or second electrode tab 12a or 12b and to allow the electrode assembly 10 not to be compressed by the edge of the first or second electrode tab 12a or 12b.

An insulating tape 13 may be attached on the surface at which each of the first and second electrode tabs 12a and 12b comes in contact with the pouch case 20 so that a portion of the insulating tape 13 is protruded to the exterior of the pouch case 20.

Here, the electrode assembly 10 is formed by winding the first electrode plate, the second electrode plate and the separator interposed therebetween. However, it will be apparent that the electrode assembly 10 may be formed by stacking the first electrode plate, the second electrode plate and the separator interposed therebetween.

Figure 3A:
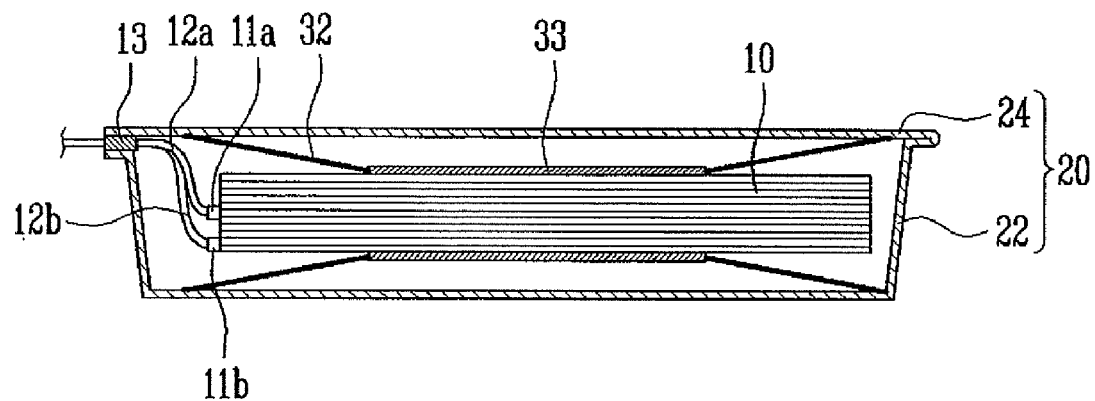
FIG. 3A is a sectional view of the pouch type secondary battery according to an embodiment of the present invention.

FIG. 3A is a sectional view of the pouch type secondary battery according to an embodiment of the present invention.

Referring to FIG. 3A, an electrode assembly 10 is inserted into a pouch case 20, and a flat plate-shaped support portion 33 connected to a second frame 32 is formed to be tightly attached to the electrode assembly 10 in the state that a predetermined pressure is applied to upper and lower portions of the electrode assembly 10 by the support portion 33. When the pouch case 20 is sealed by folding the cover portion 24 to the top of the accommodating portion 22, the insulating tapes 13 are respectively positioned at regions in which the electrode tabs 12a and 12b are positioned between the cover portion 24 and the accommodating portion 22.

Generally, the pouch case 20 is formed of aluminum having a thickness of 0.04 to 0.05 mm so that the external shape of the pouch case 20 is deformed when external impact is applied to the pouch case 20. However, in this embodiment, the support portion 33 is formed in the interior of the pouch case 20 having the same thickness, and thus, it is possible to prevent the external shape of the pouch case 20 from being deformed when the external impact is applied to the pouch case 20.

Figure 3B:
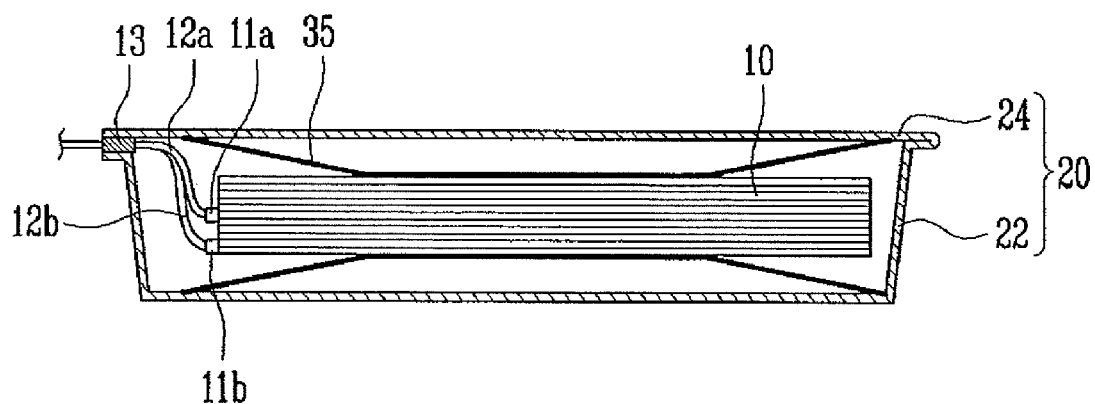
FIG. 3B is a sectional view of a pouch type secondary battery according to another embodiment of the present invention.

FIG. 3B is a sectional view of a pouch type secondary battery according to another embodiment of the present invention. Referring to FIG. 3B, a first frame, a second frame and a support portion may be formed into a single body 35. At this time, the first frame, the second frame and the support portion in the single body 35 may be formed into a metal plate or plate spring.

Here, the metal plate or plate spring is a material having a greater strength than that of the pouch case 20. It will be apparent that the first frame, the second frame and the support portion in the single body 35 may be formed of any one of materials having a greater strength than that of the pouch case 20. According to this embodiment, the metal plate or plate spring of the single body 35 has a region of the support portion, formed flat.

Figure 4A:
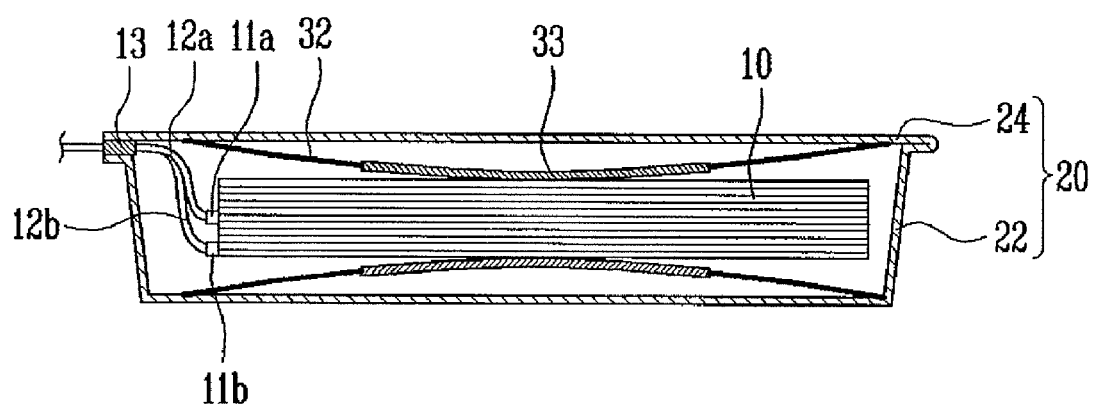
FIG. 4A is a sectional view of a pouch type secondary battery according to still another embodiment of the present invention.

FIG. 4A is a sectional view of a pouch type secondary battery according to still another embodiment of the present invention. Referring to FIG. 4A, like the embodiment described with reference to FIG. 3A, an electrode assembly 10 is accommodated in a pouch case 20, and a reinforcing member 30 is formed at a bottom inner surface of an accommodating portion 22 and an inner surface of a cover portion 24. The reinforcing member 30 includes a first frame (not shown), a second frame 32 and a support portion 33. The first frame is formed along the bottom inner surface of the accommodating portion 22 and along the inner surface of the cover portion 24. The support portion 33 is formed into a plate spring formed concavely toward the electrode assembly 10 while being spaced apart from the first frame. A portion of the center of the support portion 33 comes in contact with the electrode assembly 10. The second frame 32 connects the first frame and the support portion 33 to each other, and may be formed in the shape of a curved surface formed concavely toward the electrode assembly 10.

As such, the support portion 33 and the second frame 32 are formed concavely toward the electrode assembly 10, so that the area at which the support portion 33 comes in contact with the electrode assembly 10 is decreased. Accordingly, it is possible to reduce the damage of an active material coated on the outer surfaces of positive and negative electrode plates in the electrode assembly 10 when impact is applied to the secondary battery.

Figure 4B:
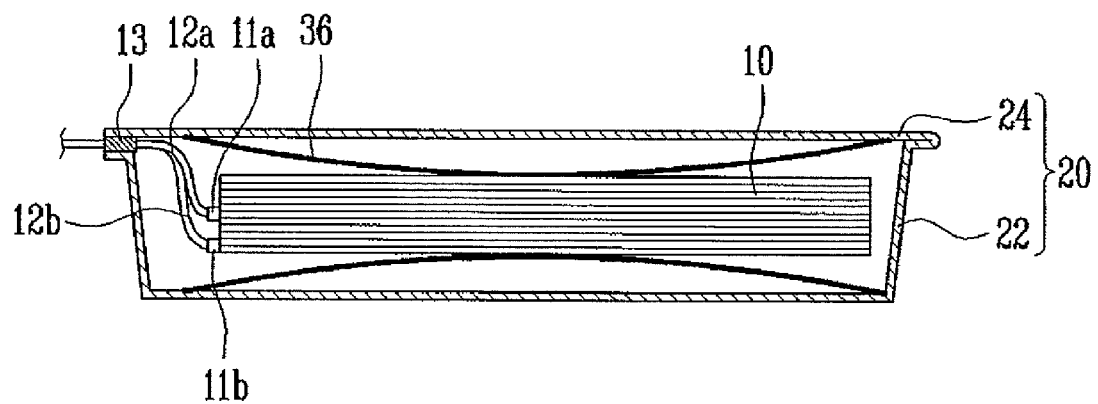
FIG. 4B is a sectional view of a pouch type secondary battery according to still another embodiment of the present invention.

FIG. 4B is a sectional view of a pouch type secondary battery according to still another embodiment of the present invention. Referring to FIG. 4B, like the embodiment described with reference to FIG. 3B, a first frame, a second frame and a support frame may be formed in a single body 36. At this time, the first frame, the second frame and the support portion in the single body 36 may be formed into a metal plate or plate spring. According to this embodiment, the metal plate or plate spring in the single body 36 has the region of the support portion formed concavely toward an electrode assembly 10, so that it is possible to reduce the damage of an active material in the electrode assembly 10.

Figure 5:
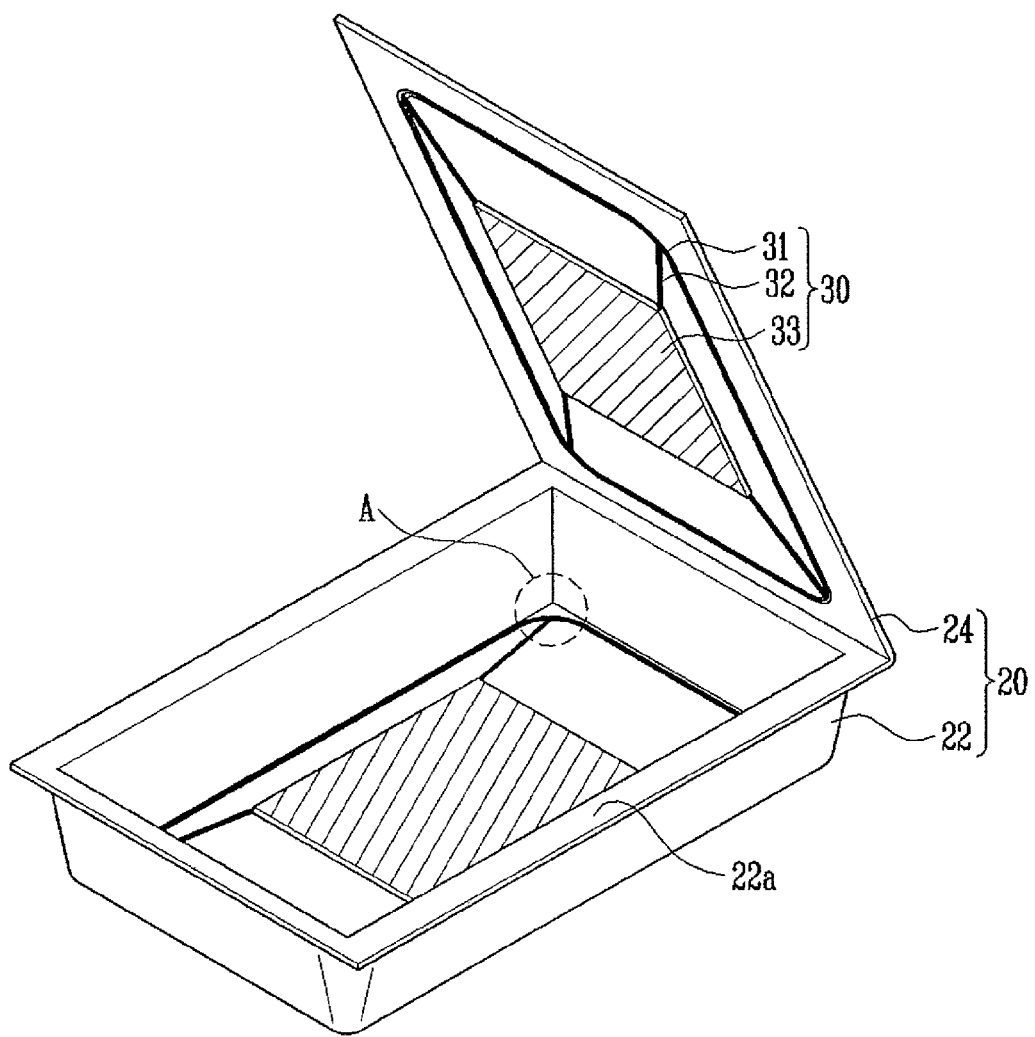
FIG. 5 is a perspective view illustrating a reinforcing member formed at a pouch case according to still another embodiment of the present invention.

FIG. 5 is a perspective view illustrating a reinforcing member formed in a pouch case according to still another embodiment of the present invention. The descriptions of components of this embodiment identical to those of the embodiment described with reference to FIG. 3A will be omitted.

Referring to FIG. 5, the reinforcing member 30 according to this embodiment includes a first frame 31 formed at a bottom inner surface of an accommodating, portion 22 and an inner surface of a cover portion 24; a support portion 33 formed in the shape of a plate while being spaced apart from the first frame 31; and a second frame 32 to connect the first frame 31 and the support portion 33 to each other.

Here, a corner A of the first frame 31 has a rounded form. Accordingly, when the secondary battery is hit, since the corner A of the first frame 31 does not directly contact the accommodating portion 22 at the corners, the corner A provides added protection to the pouch case 20 and prevents the pouch case 20 from being broken, thereby enhancing the safety of the secondary battery.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
   an electrode assembly having a first electrode plate, a second electrode plate and a separator interposed therebetween;
   a pouch case having an accommodating portion to accommodate the electrode assembly and a cover portion to seal the accommodating portion; and
   a reinforcing member formed between the pouch case and the electrode assembly,
   wherein the reinforcing member comprises a first frame formed along at least one surface of the pouch case;
   a support portion formed in a shape of a plate while being spaced apart from the first frame, and a second frame configured to connect the first frame with the support portion, and
   wherein at least a portion of the reinforcing member is in contact with the electrode assembly.

2. The secondary battery according to claim 1, wherein the reinforcing member is formed on at least one of a bottom inner surface of the accommodating portion and an inner surface of the cover portion.

3. The secondary battery according to claim 1, wherein the first frame, the second frame and the support portion are formed into a single metal plate.

4. The secondary battery according to claim 3, wherein the support portion of the single metal plate is formed flat.

5. The secondary battery according to claim 3, wherein the support portion of the single metal plate is formed concavely toward the electrode assembly.

6. The secondary battery according to claim 1, wherein the first frame, the second frame and the support portion are formed into a single plate spring.

7. The secondary battery according to claim 6, wherein the support portion of the single plate spring is formed flat.

8. The secondary battery according to claim 6, wherein the support portion of the single plate spring is formed concavely toward the electrode assembly.

9. The secondary battery according to claim 1, wherein the support portion is formed into a metal plate.

10. The secondary battery according to claim 1, wherein the support portion is formed into a plate spring.

11. The secondary battery according to claim 1, wherein the support portion is formed flat.

12. The secondary battery according to claim 1, wherein the support portion is formed concavely toward the electrode assembly.

13. The secondary battery according to claim 1, wherein the first and second frames are formed into an elastic body.

14. The secondary battery according to claim 1, wherein a surface size of the support portion is at or between 30 to 100% of a size surface of the electrode assembly.

15. The secondary battery according to claim 1, wherein the reinforcing member is forcibly inserted into the pouch case.

16. The secondary battery according to claim 1, wherein the reinforcing member is fixed to the pouch case using tape.

17. The secondary battery according to claim 1, wherein the reinforcing member is fixed to the pouch case using heat compression.

18. The secondary battery according to claim 1, wherein corners of the first frame have a rounded form.

19. The secondary battery according to claim 1, wherein the support portion, the first frame and the second frame are formed of a material having a greater strength than a material of the pouch case.

20. The secondary battery according to claim 1, wherein the electrode assembly is formed by winding the first electrode plate, the second electrode plate and the separator interposed therebetween.

21. The secondary battery according to claim 1, wherein the electrode assembly is formed by stacking the first electrode plate, the second electrode plate and the separator interposed therebetween.

22. A secondary battery comprising:
- an electrode assembly having a first electrode plate, a second electrode plate and a separator interposed therebetween;
- a pouch case having an accommodating portion to accommodate the electrode assembly and a cover portion to seal the accommodating portion; and
- a reinforcing member formed on at least one of the accommodating portion and the cover portion,
- wherein the reinforcing member comprises a first frame formed along at least one of an inner surface of the accommodation portion and an inner surface of the cover portion;
- a support portion configured to contact the electrode assembly and spaced apart from the first frame by a predetermined distance, and a second frame configured to connect the first frame and the support portion, and
- wherein at least a portion of the reinforcing member is in contact with the electrode assembly.

23. The secondary battery according to claim 22, wherein corners of the first frame are rounded.

* * * * *